United States Patent [19]
Tani et al.

[11] Patent Number: 5,250,339
[45] Date of Patent: Oct. 5, 1993

[54] MAGNETIC RECORDING MEDIUM

[75] Inventors: Noriaki Tani; Kyuzo Nakamura; Michio Ishikawa; Masanori Hashimoto; Yoshifumi Ota, all of Chiba, Japan

[73] Assignee: Nihon Shinku Gijutsu Kabushiki Kaisha, Chigasaki, Japan

[21] Appl. No.: 940,753

[22] Filed: Sep. 8, 1992

Related U.S. Application Data

[63] Continuation of Ser. No. 594,905, Oct. 9, 1990, abandoned.

[30] Foreign Application Priority Data

Oct. 9, 1989 [JP] Japan ................... 1-262202

[51] Int. Cl.$^5$ ............................ G11B 5/66; B32B 3/02
[52] U.S. Cl. ........................................ 428/64; 428/65; 428/336; 428/694; 428/900; 428/663; 427/130; 427/131
[58] Field of Search .................. 428/64, 65, 694, 900, 428/336, 663, 665, 666, 667, 678; 427/131, 130

[56] References Cited

U.S. PATENT DOCUMENTS

| | | | |
|---|---|---|---|
| 4,698,251 | 10/1987 | Fukuda et al. | 428/64 |
| 4,725,470 | 2/1988 | Katsuki | 428/64 |
| 4,735,840 | 4/1988 | Hedgcoth | 428/65 |
| 4,876,117 | 10/1989 | Bornstein | 428/64 |
| 4,973,496 | 11/1990 | Kruger et al. | 428/64 |

OTHER PUBLICATIONS

Patents Abstracts of Japan, vol. 13, No. 91 (P837), Mar. 3, 1989, (for Japanese Patent Publication No. 63 273 208).

Seagle et al, Journal of Applied Physics, vol. 61, No. 15, Apr. 15, 1987, pp. 4025-4027.

Primary Examiner—Paul J. Thibodeau
Assistant Examiner—Leszek Kiuman
Attorney, Agent, or Firm—Armstrong, Westerman, Hattori, McLeland & Naughton

[57] ABSTRACT

A magnetic recording medium suitable for high-density recording which comprises a non-magnetic substrate disk, at least one magnetic layer and at least one protective layer, the magnetic layer and the protective layer being formed in succession on the non-magnetic substrate disk, wherein the non-magnetic substrate disk comprises a glass substrate and at least one non-magnetic metallic film provided on the glass substrate, and the non-magnetic metallic film is provided on a surface thereof with a multitude of fine concentric grooves.

1 Claim, 1 Drawing Sheet

MAGNETIC RECORDING MEDIUM

This application is a continuation of application Ser. No. 594,905 filed Oct. 9, 1990, now abandoned.

BACKGROUND OF THE INVENTION

This invention relates to a magnetic recording medium, and in particular to a longitudinal magnetic recording medium having a high recording density.

A magnetic recording medium in which a film of Cr, W or Mo or an alloy film consisting essentially of one of these metals is formed, by vapor deposition or sputtering, as a sublayer on a non-magnetic substrate, and in which a Co film or a Co-alloy film is formed on top of the sublayer, is widely used as a hard disc medium capable of high-density recording. In this hard disk recording medium, the memory is reproduced by a magnetic head flying over the recording medium which is rotated at a high speed. In this connection, it is known that if the flying height of the magnetic head can be reduced, the recording density is consequently increased.

Conventional hard disc substrates which are widely used are: a metallic substrate such as an Al-substrate having a nonmagnetic metallic plating thereon, or an "ALMITE"-substrate, or a glass substrate.

By performing a so-called texturing treatment so as to provide a multitude of fine concentric grooves on the surface of the metallic substrate, the coefficient of friction of the recording medium is made smaller as a result of decreasing the effective area of contact between the substrate and the magnetic head. In addition, it is common practice to be able to manufacture with a metallic substrate a disk having circular magnetic anisotropy in the magnetic layer characterized by good squareness of the hysteresis loop in the circular direction.

However, when a metallic substrate is used, the disk surface cannot be made completely smooth due to protrusions, minute undulations, or other irregularities attributable to the presence of intermetallic compounds or defects. Therefore, when the flying height of the magnetic head is reduced, a so-called phenomenon of head crushing occurs in which the magnetic head and the protrusions on the disk collide with each other, resulting in breakage of the magnetic recording medium. Even in the case where the above-mentioned texture-treated substrate is used, this kind of undulations and protrusions cannot be completely removed and, consequently, head crushing is also likely to occur. Therefore, with a magnetic recording medium using a metallic substrate, the flying height of the magnetic head cannot be made small enough, consequently limiting the extent to which the recording density could be increased.

On the other hand, when a glass substrate is used, greater smoothness can be obtained than when a metallic substrate is used. However, the magnetic head and the disk tend to adhere to each other, resulting in a high coefficient of friction and, in an extreme case, the magnetic head and the disk become stuck together so that the disk can no longer be rotated. In order to lower the coefficient of friction, it is also known to texture-treat the glass substrate. In this case, however, because magnetic anisotropy in the circular direction of the disk cannot be obtained, the squareness of the hysteresis loop is poor, which makes the disk unsuitable for high-density recording. Further, when a glass substrate is used, the coercive force of the magnetic recording film which can be obtained is small and, because glass is an electrically insulating body, it cannot be charged with a substrate bias which is one of the means of increasing the coercive force, thus making such a disk unsuitable for high-density recording.

As has been explained above, prior to applicants' invention there was no magnetic recording medium which met all the conditions which would make it suitable for high-density recording.

SUMMARY OF THE INVENTION

An object of this invention is to provide a magnetic recording medium in which all the above-mentioned conditions which make it suitable for high-density recording are met, such conditions being smoothness of the surface, a shape enabling the reduction of the coefficient of friction, so-called circular magnetic anisotropy in the magnetic layer characterized by good squareness of the hysteresis loop in the circular direction, and a large coercive force.

The magnetic recording medium of the invention comprises a non-magnetic substrate disk, at least one magnetic layer and at least one protective layer, the magnetic layer and the protective layer being formed in succession on the non-magnetic substrate disk, wherein the non-magnetic substrate disk comprises a glass substrate and at least one non-magnetic metallic film provided on the glass substrate, and the non-magnetic metallic film is provided on a surface thereof with a multitude of fine concentric grooves.

DETAILED DESCRIPTION OF THE INVENTION

The magnetic recording medium of this invention is made by first forming by vapor deposition or sputtering, on a glass substrate having a smooth surface, a non-magnetic metallic film consisting essentially of one of the following metallic materials: NiP, Ti, Al, Cr, Cu, Mo, Ta, or W, or the like; or an alloy consisting essentially of one of the above-mentioned metallic materials; or a stainless steel, and then performing texture-treating of the non-magnetic metallic film. Then, the manufacture of the magnetic recording medium of this invention, which is capable of high-density recording, is completed by forming in succession, on the substrate disk thus formed and by vapor deposition or sputtering in vacuum, first a sublayer comprising a film of Cr, W or Mo or an alloy film consisting essentially of Cr, W or Mo, then a magnetic layer comprising a Co film or a Co-alloy film consisting essentially of Co, and then a protective layer comprising a C film, a $SiO_2$ film, a $ZrO_2$ film, or the like. It is preferable that the thickness of the non-magnetic metallic film be in the range of not less than 0.03 $\mu$m (i.e., micron) and not more than 5 $\mu$m.

In the magnetic recording medium of this invention, which has the above-mentioned construction, in particular the above-mentioned construction of the non-magnetic substrate, the advantageous surface characteristics of the glass substrate disk (i.e., very smooth surface without protrusions or undulations) are retained. Therefore, the flying height of the magnetic head can be made very small, resulting in an increase in the recording density. In addition, appropriate surface characteristics can be obtained so that no adhesion occurs between the magnetic head and the surface of the recording medium, and a coefficient of friction which is close to the one at the time of sliding can be maintained. Furthermore, by performing the texturing treatment of the surface of the non-magnetic metallic film, so-called circular magnetic anisotropy which is characterized by good squareness of the hysteresis loop in the circular direction can be obtained in the magnetic layer which is formed on the non-magnetic metallic film. Still furthermore, a glass substrate which is an electrically insulating body if used alone, can be made electrically conductive when it is used in the form of a substrate disk of this invention. Therefore, by using the process of charging the substrate with a negative bias, a high coercive force in the magnetic characteristics of the recording medium can be obtained.

A preferred embodiment of the magnetic recording medium of this invention is explained below by reference to the drawings in FIGS. 1 and 2.

Figure 1:
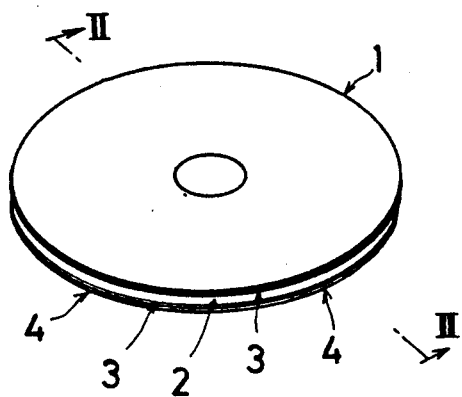
FIG. 1 is a perspective view showing the overall construction of an embodiment of the magnetic recording medium of this invention.
Figure 2:
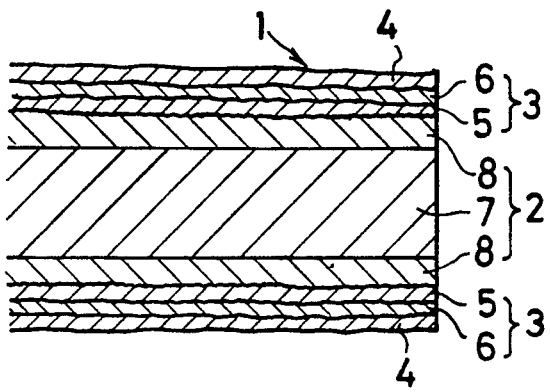
FIG. 2 is a sectional view taken along the line A—A of FIG. 1.

As shown in FIGS. 1 and 2, the magnetic recording medium 1 comprises a non-magnetic substrate disk 2, magnetic layers 3 formed on the substrate disk 2, and protective layers 4 formed on the magnetic layers 3. Each of the magnetic layers 3 comprises a sublayer 5 of a film of Cr, W or Mo or an alloy film consisting essentially of Cr, W, or Mo, and a main magnetic layer 6 which comprises a Co film or a Co-alloy film consisting essentially of Co and which is formed on the sublayer 5.

The non-magnetic substrate disk 2 comprises a glass substrate 7 having a smooth surface, and a non-magnetic metallic film 8 which is formed on the glass substrate 7 and which has a thickness in the range of not less than 0.03 μm and not more than 0.5 μm. This non-magnetic metallic film 8 is formed of the one of following metallic materials: NiP, Ti, Al, Cr, Cu, Mo, Ta, or W; or an alloy consisting essentially of one of the above-mentioned metallic materials; or a stainless steel.

On the surface of the non-magnetic metallic film 8, a multitude of concentric grooves, i.e., texturing, are provided. As a result of the texturing, minute concentric irregularities (projections and depressions) are formed also on the surface of the magnetic recording medium 1.

The following is a description of the actual manufacturing of the above-mentioned magnetic recording medium. First, smooth glass substrates having a surface roughness Ra (average roughness) of 0.002 μm were placed inside a treatment chamber. After evacuating the treatment chamber to $5 \times 10^{-6}$ Torr or below, argon gas was introduced thereinto to bring the treatment chamber to $2 \times 10^{-3}$ Torr. By a DC magnetron sputtering method, NiP films of various thicknesses of 0.02, 0.03, 0.1, 0.5, 1, 5 and 10 μm were formed respectively on the glass substrates. Thereafter, the glass substrates (coated on both sides with the NiP films) were taken out of the treatment chamber into the atmosphere, and were subjected to texturing treatment by buffing them in succession with buffing tapes of roughness Nos. 6000 ("Imperial Lapping Film", particle size of 3 microns, produced by Sumitomo 3M Ltd. of Japan) and 15000 ("WA 15000", corresponding to particle size of 0.3 micron, produced by Nippon Micro-Coating Co., Ltd. of Japan), respectively, using a texturing apparatus. The substrates were then washed and dried, thereby providing non-magnetic substrate disks for the magnetic recording medium of this invention.

Each of these substrate disks was placed inside the vacuum treatment chamber. After the vacuum chamber was evacuated to a pressure of $1 \times 10^{-6}$ Torr or below and the substrate temperature was heated to 280° C., argon gas was introduced into the chamber to bring the pressure therein to $2 \times 10^{-3}$ Torr. A Cr film was then formed on each of the substrate disks to a thickness of 1500 Å by a DC magnetron sputtering method. Then, a Co-alloy film containing 20 at % of Ni and 10 at % of Cr (the balance consisting essentially of Co) was formed in succession to a thickness of 700 Å on each of the substrates disks. Negative voltage of 300 V was charged to the substrate when the Cr film and CoNiCr film were formed. A carbon film as a protective layer was further formed on top of the CoNiCr film to a thickness of 300 Å, thereby completing the manufacture of an embodiment of the magnetic recording medium of this invention.

The surface conditions of each of the substrate disks after texturing with the various NiP thicknesses in the above-mentioned examples were observed. The frequency of head crushing with the recording medium manufactured with the above-mentioned substrate disks was also observed, using a CSS (contact-start-and-stop) testing apparatus. The surface conditions were visually checked. The frequency of head crushing was obtained by counting the number of signals generated when a piezoelectric element mounted on the magnetic head crushes a recording medium which is rotated at a flying height of the head of 0.1 μm, i.e., the frequency of crushing of the magnetic head against the projections on the surface of the recording medium. The results are shown in Table 1.

TABLE 1

| NiP film thickness (μm) | Surface conditions after texturing treatment | Frequency of crushing of magnetic head against disk (times) |
| --- | --- | --- |
| 0.02 | Not uniform, partially peeled off | very frequent |
| 0.03 | almost uniform | 0 |
| 0.1 | uniform, good | 0 |
| 0.5 | uniform, good | 0 |
| 1 | uniform, good | 0 |
| 5 | uniform, good | 1 |
| 10 | uniform, good | 5 |

As seen from Table 1, when the NiP film thickness is 0.02 μm, the film is so thin that partial peeling-off takes place and consequently a uniform textured surface cannot be obtained, resulting in frequent head crushing. However, with film thicknesses of 0.03 μm and above, good and uniform textured surfaces can be obtained. If the film thicknesses are 10 μm and above, on the other hand, the frequency of crushing between the magnetic head and the disk increases, despite the presence of good and uniform textured surfaces. The reason for this increase seems to be due to the fact that, because the NiP film is too thick, the smooth surface characteristics of the original glass substrate can no longer be reflected (or reproduced) in the NiP film which has minute undulations or protrusions due to abnormal growth.

Judging from the above results, the non-magnetic metallic film on the glass substrate of the magnetic recording medium of this invention preferably should have a thickness in the range of not less than 0.03 μm and not more than 5 μm.

Specific embodiments of this invention as well as comparative examples are described below.

EMBODIMENT 1

Embodiment 1 is magnetic recording medium having a Nip film of a thickness of 0.5 μm as a non-magnetic metallic film, and manufactured according to the above-described manufacturing method.

EMBODIMENT 2

Instead of a NiP film, a Ti film was formed in a thickness of 0.2 μm. Texturing was performed with buffing tapes of roughness Nos. 3000 ("Imperial Lapping Film", particle size of 5 microns, produced by Sumitomo 3M Ltd. of Japan) and 10000 ("Imperial Lapping Film", particle size of 1 micron, produced by Sumitomo 3M Ltd. of Japan). The other conditions are the same as in Embodiment 1.

COMPARATIVE EXAMPLE 1

A smooth glass substrate having a surface roughness Ra of 0.002 μm was made, as such, into a hard disk substrate.

COMPARATIVE EXAMPLE 2

A commercially available hard disk substrate comprising a NiP plating of a thickness of 15 μm on Al, wherein the surface of the NiP plating was texture-treated and mirror-finished, was used as a substrate disk.

Using the recording media of the above-mentioned Embodiments 1 and 2 and Comparative Examples 1 and 2, measurements were made of the frequency of crushing between the magnetic head and the recording medium as the flying height of the magnetic head was reduced. The results are shown in FIG. 3.

Figure 3:
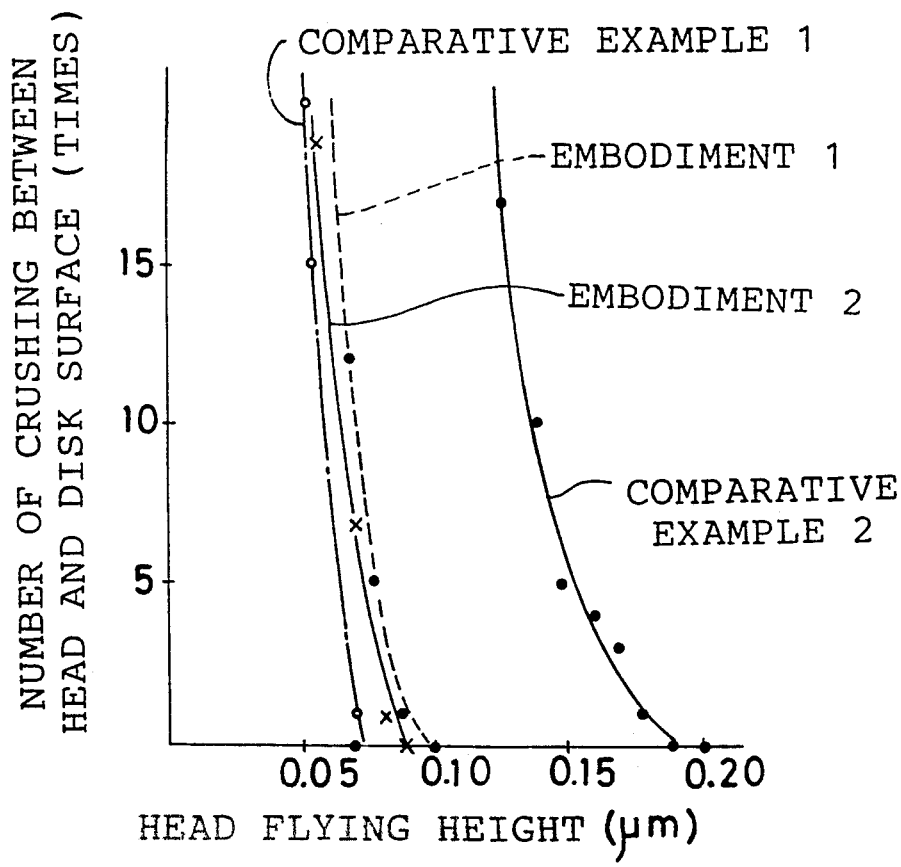
FIG. 3 is a diagram showing the relationship between the flying height of a magnetic head and the frequency of the crushing of the head against a disk.

As seen from FIG. 3, in the case of Comparative Example 2, when the flying height of the magnetic head is reduced to less than 0.15 μm, the frequency of crushing between the magnetic head and the disk rapidly increases. On the other hand, in the case of Embodiments 1 and 2 and Comparative Example 1, there is no crushing between the magnetic head and the disk until the flying height is reduced to 0.09 μm. This is due to the fact that, as previously explained, in the case of Comparative Example 2 the original Al-substrate plated with NiP has minute undulations or protrusions which cannot be completely removed even after texturing treatment.

Next, the following measurements were made on each of the recording media of the Embodiments and the Comparative Examples: coercive force as measured by a vibrating sample magnetometer; squareness in the hysteresis loop in the circular direction; friction coefficients after 10,000 times of CSS test measured by the CSS testing apparatus; and linear recording densities $D_{50}$ (recording density at which the output becomes 50%) measured at a flying height at which the magnetic head can be stably flown without crushing against the disk. The results are shown in Table 2.

TABLE 2

| Substrate | Coercive force (Oe) | Squareness of hysteresis loop in circular direction | Coefficient of friction after 10000 times CSS test | $D_{50}$* (KFRPI)** |
|---|---|---|---|---|
| Embodiment 1 | 1600 | 0.90 | 0.24 | 60 |
| Embodiment 2 | 1480 | 0.89 | 0.21 | 57 |
| Comparative Example 1 | 960 | 0.77 | 2 or over | 56 |
| Comparative Example 2 | 1630 | 0.92 | 0.23 | 31 |

*Value measured at flying height of magnetic head when it is stably flown above disk. (Comparative Example 2 at flying height of 0.2 μm, and the remaining at 0.10 μm.)
**Kilo Flux Return per Inch.

As seen from Table 2, with substrate disks characterized by surfaces which are of a metallic material and by circumferential texturing treatment, as in Embodiments 1, 2 and Comparative Example 2, the coercive forces of the recording media are high and the squareness of the hysteresis loop in the circular direction is large. Consequently, magnetic characteristics suitable for high density recording can be obtained. However, since it is impossible to secure a stable flying height in Comparative Examples 2 as previously explained, it is clear that Embodiment 1 is far superior in characteristics for high-density recording when the $D_{50}$ values are compared. In addition, in the case of Comparative Example 1, the substrate surface is too smooth and the coefficient of friction after 10,000 times of CSS test exceeds 2. Therefore, it is impossible in practice to use the magnetic recording medium of Comparative Example in view of its lack of durability. Additionally, the magnetic characteristics of the recording medium of Comparative Example 1 are poor, in that it is possible to obtain a $D_{50}$ value of only 56 KFRP due to a small coercive force, and the hysteresis loop in the circular direction has a poor squareness.

The above results show that the magnetic recording media manufactured with the substrate disks according to the Embodiments 1 and 2 of this invention are most suitable as highly reliable high-density magnetic recording media.

The above described substrate disks can also be used as substrate disks for perpendicular magnetic recording systems using Co-Cr or Co-Re-P as a magnetic recording layer.

As described above, the magnetic recording medium according to this invention has surface characteristics which make possible the operation of the magnetic head at a stable and small flying height and with a small coefficient of friction. The magnetic recording medium of this invention also has a circular magnetic anisotropy, a high coercive force, and superior high-density recording characteristics.

We claim:
1. A magnetic recording medium comprising:
 (A) a non-magnetic substrate disk;
 (B) at least one magnetic layer; and
 (C) at least one protective layer;
 said magnetic layer (B) and said protective layer (C) being formed in succession on the non-magnetic substrate disk (A),
 wherein the non-magnetic substrate disk (A) comprises
 (1) a glass substrate having a smooth surface, and

(2) at least one electrically conductive non-magnetic metallic film provided on a surface of the glass substrate by vapor deposition or sputtering in vacuum, said electrically conductive non-magnetic metallic film (A) (2) having a thickness in the range of not less than 0.03 μm and not more than 5 μm, and being provided on a surface thereof with a multitude of fine concentric grooves by texturing treatment of said surface of the electrically conductive non-magnetic metallic film (A) (2);

wherein the magnetic layer (B), which is provided on the surface of the electrically conductive non-magnetic metallic film (A) (2), comprises
(1) a sublayer which is a film of Cr, W or Mo or a film of an alloy consisting essentially of Cr, W or Mo, said sublayer (B) (2) being formed by vapor deposition or sputtering in vacuum; and
(b 2) a main magnetic layer which is a film of Co or a film of an alloy consisting essentially of Co, said main magnetic layer (B) (2) being formed by vapor deposition or sputtering in vacuum on the sublayer (B) (1); and wherein said protective layer (C) is provided on the main magnetic layer (B) (2).

* * * * *

UNITED STATES PATENT AND TRADEMARK OFFICE
CERTIFICATE OF CORRECTION

PATENT NO.:    5,250,339
DATED     :    October 5, 1993
INVENTOR(S):   Noriaki TANI et al It is certified that errors appear in the above-identified patent and that said Letters Patent is hereby corrected as shown below:

Column 8, line 6, delete "sublayer (B)(2)" and substitute therefor --sublayer (B)(1)--.

Column 8, line 8, delete "(b 2)" and substitute therefor --(2)--.

Signed and Sealed this

Twenty-third Day of July, 1996

*Attest:*

BRUCE LEHMAN

*Attesting Officer*        *Commissioner of Patents and Trademarks*